(12) United States Patent
Cheon

(10) Patent No.: US 7,785,643 B2
(45) Date of Patent: Aug. 31, 2010

(54) PREPARATION METHOD OF RETORT ROAST CHESTNUTS USING FAR INFRARED RAY THAWING

(75) Inventor: Hee Soon Cheon, Seoul (KR)

(73) Assignee: CJ Cheiljedang Corp., Seoul (KR)

( * ) Notice: Subject to any disclaimer, the term of this patent is extended or adjusted under 35 U.S.C. 154(b) by 436 days.

(21) Appl. No.: 11/791,531

(22) PCT Filed: Jul. 26, 2005

(86) PCT No.: PCT/KR2005/002418

§ 371 (c)(1), (2), (4) Date: May 24, 2007

(87) PCT Pub. No.: WO2006/065018

PCT Pub. Date: Jun. 22, 2006

(65) Prior Publication Data

US 2008/0138476 A1    Jun. 12, 2008

(30) Foreign Application Priority Data

Dec. 16, 2004    (KR) .................... 10-2004-0107079

(51) Int. Cl.
A23L 1/217    (2006.01)
(52) U.S. Cl. .............. 426/242; 426/241; 426/399; 426/521; 426/598
(58) Field of Classification Search ............. 426/665, 426/399, 407, 521, 241, 242, 598, 316, 392
See application file for complete search history.

(56) References Cited

U.S. PATENT DOCUMENTS 3,630,747 A * 12/1971 Lowe et al. ............... 426/507
7,357,952 B2 * 4/2008 Foroutanaliabad et al. .. 426/241

FOREIGN PATENT DOCUMENTS

| CN | 1633911 | * | 7/2005 |
| JP | 55-15789 A | | 2/1980 |
| JP | 60184375 | * | 9/1985 |
| JP | 63-240763 A | | 10/1988 |

(Continued)

OTHER PUBLICATIONS

MAP NPL, 2003.*
Chinese Sugar Fried Chesnut NPL, Jul. 3, 2005.*
60184375 abstract NPL.*

(Continued)

Primary Examiner—Drew E Becker
Assistant Examiner—Preston Smith
(74) Attorney, Agent, or Firm—Birch, Stewart, Kolasch & Birch, LLP

(57) ABSTRACT

The present invention related to a preparing method of retort roast chestnuts using far infrared ray thawing, more particularly a preparing method characterized in that it comprises a step of ageing a harvested chestnuts by storing in the state of refrigeration to increase sugar content; roasting said aged chestnuts at 170~200° C. during 5~10 minutes to increase its taste and flavor; peeling and then washing followed by rapid freezing it; thawing frozen chestnuts by far infrared ray at 170~230° C. during 30~60 minutes to inhibit generation of microorganism and remove generation of an extraordinary taste or smell and deformity during a processing procedure; and pasteurizing with multi-steps after packing thawed chestnuts with a nitrogen substitution to minimize degradation of texture.

6 Claims, 4 Drawing Sheets
(4 of 4 Drawing Sheet(s) Filed in Color)

| | FOREIGN PATENT DOCUMENTS | | |
|---|---|---|---|
| JP | 63-273435 | A | 11/1988 |
| JP | 1-309669 | A | 12/1989 |
| JP | 6-209702 | A | 8/1994 |
| JP | 2002447471 | * | 3/2002 |

OTHER PUBLICATIONS

CN1633911abstract NPL.*

JP2002078466 abstract NPL.*

* cited by examiner

PREPARATION METHOD OF RETORT ROAST CHESTNUTS USING FAR INFRARED RAY THAWING

TECHNICAL FIELD

The present invention related to a preparing method of retort roast chestnuts using far infrared ray thawing, more particularly a preparing method characterized in that it comprises a step of; ageing raw chestnuts by storing in the state of refrigeration; roasting said aged chestnuts, peeling and then washing followed by rapid freezing it; thawing frozen chestnuts by far infrared ray; pasteurizing with multi-steps after packing thawed chestnuts with a nitrogen substitution.

BACKGROUND ART

Chestnuts are plant belonging to Fagaceae, and it have been cultured in a vast range such as Europe, America, China, Japan and the like. Also, it has been known that chestnuts have abundant vitamin, and is good for digestive rate due to containing 40% of starch, and its nutrition is abundant.

To provide chestnuts having the above-mentioned property as table use, chestnut which had been treated with boiling down or soaking chestnuts with sugar, thereby lowering a moisture activity, to prevent from decomposing it by microorganism, have been provided, or chestnuts which had been treated with sugar and sterilized have been provided. Furthermore, it has been popularized the method that eat boiled chestnuts at raw state. On the other hand, it has been prevailed the method providing to consumer the processed chestnuts by roasting harvested chestnuts, and peeling, and then washing and freezing it followed by packing in a pouch, and then retort sterilizing without a thawing procedure or packing in a pouch with a nitrogen substitution and first sterilizing at high temperature (121° C., 30 minutes) without a thawing procedure.

However, the above-mentioned prior art has a various drawback, for example, generation of an extraordinary taste or smell during a processing procedure since it is provided in state of packing or sterilizing a boiling down or soaking chestnuts with sugar without a thawing procedure, deformity of a shape, propagation of microorganism, and decrease of gusto and functionality by degrading of structure at first sterilizing at high temperature.

To solve the above drawback, Japanese patent early publication Hei 06-209702 discloses a preparing procedure for a processing chestnuts constituted with a step of; peeling harvested chestnuts, and freezing it followed by thawing, and boiling to remove a moisture, and burning to allow an ash color to chestnuts after rapid freezing and heating with far infrared ray, and than soaking chestnuts with sugar followed by rapid freezing it and adding a seasoning and mixing it, and finally packing and then retort sterilizing as itself. Namely, the above-mentioned Japanese patent early publication Hei 06-209702 provide an advantage that it allow to increase sugar content by comprising a heating process with far infrared ray, increase storing capacity, and produce industrially with massive volume.

However, the said prior method is also not economical in aspect of time and cost, and is complex and cumbersome since the procedure is consisted of 9 steps of thawing and boiling process→rapid freezing process→heating process with far infrared ray (230~280° C., 5~10 minutes)→burning process to allow an ash color→soaking process in sugar solution→rapid freezing process→adding a seasoning and mixing process→packing process→retort sterilizing process. Furthermore, it has a drawback that a taste and nutritional ingredient of chestnuts is degraded rapidly because of refrigerating storage after peeling a harvested chestnuts, and an original taste and favor of chestnuts is inflicted a lose since, in the method, sugar solution and seasoning is used to improve sugar content and taste of chestnuts.

DISCLOSURE OF INVENTION

The present invention is to solve the problem of prior art, and this objection of the present invention can be achieved by providing a preparing procedure of retort roast chestnuts whose quality is good and original taste and favor is remained, and characterized in that it is prepared by simple procedure ageing only chestnuts 100% by storing in the state of refrigeration without addition any other adduct; roasting said aged chestnuts by direct burning, peeling and then washing followed by rapid freezing it; thawing frozen chestnuts by far infrared ray; and pasteurizing with multi-steps after packing thawed chestnuts with a nitrogen substitution.

Therefore, the objection of the present invention is to provide a new method being capable of preparing retort roast chestnuts which are kept its original favor and tissue sense, and removed generation of an extraordinary taste or smell and deformity during a processing procedure, and can be stored stable, and are delicious by being increased sugar content.

To achieve the present invention, a preparing procedure of retort roast chestnuts is provided characterized in that it comprises a step of;

Ageing by storing in the state of refrigeration after harvesting raw chestnuts;

Freezing rapidly after roasting said aged chestnuts, peeling and then washing;

Thawing frozen chestnuts by far infrared ray; and

Pasteurizing with multi-steps after packing thawed chestnuts with a nitrogen substitution.

The patent or application file contains at least one drawing executed in color. Copies of this patent or patent application publication with color drawing(s) will be provided by the office upon request and payment of the necessary fee.

DESCRIPTION OF DRAWINGS

Other objects and aspects of the present invention will become apparent from the following description of embodiments with reference to the accompanying drawing in which.

Figure 1:
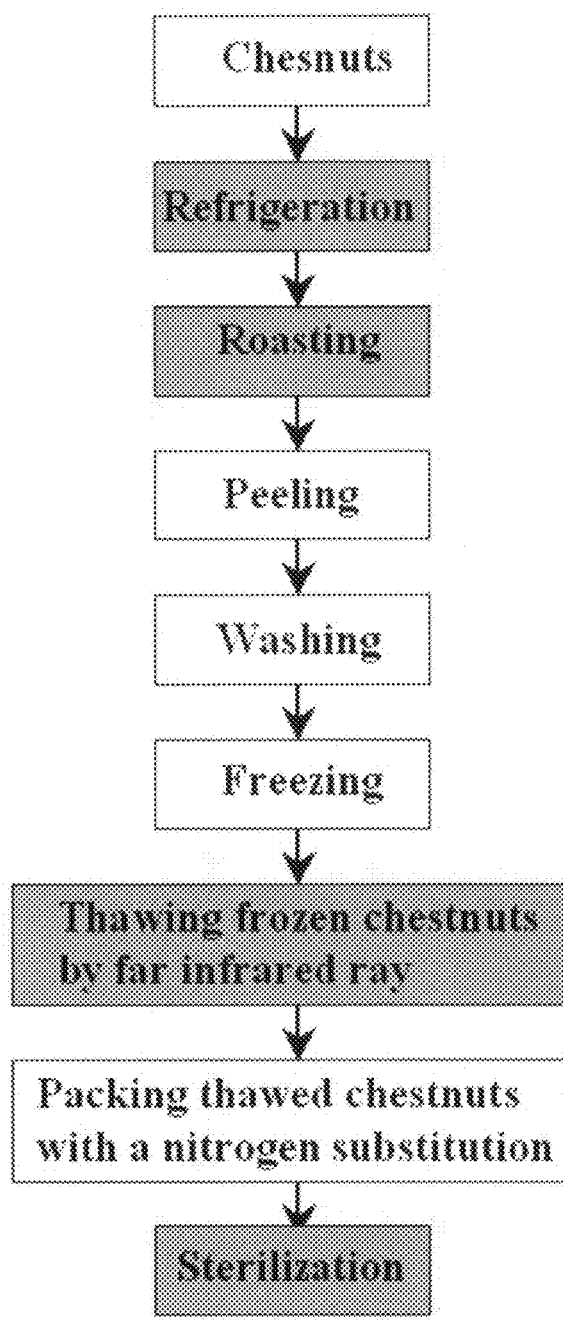
FIG. 1 is a flow chart showing preparing procedure of retort roast chestnuts according to the present invention.
Figure 2:
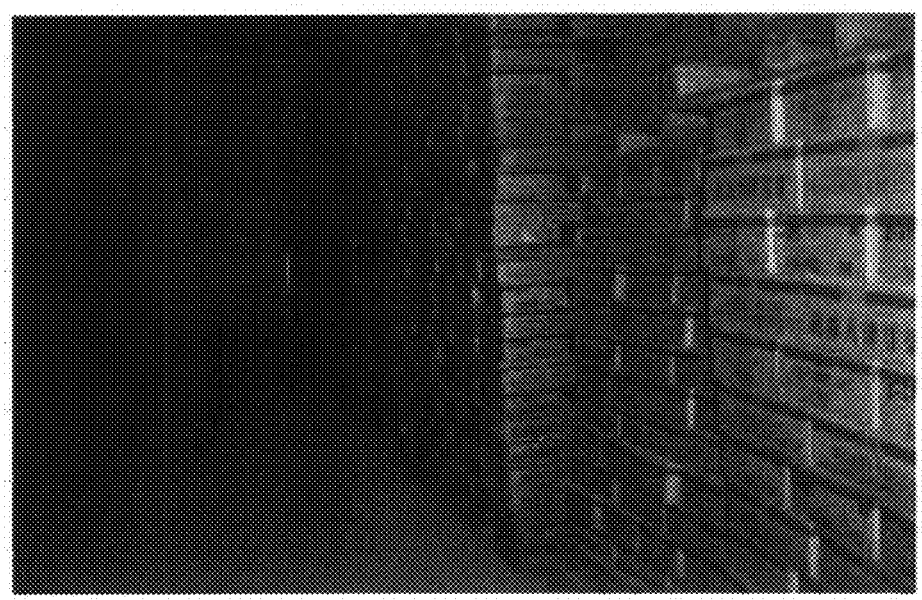
FIG. 2 is a photograph showing process for increasing sugar content of raw chestnuts by storing harvested chestnuts in refrigeration.
Figure 3:
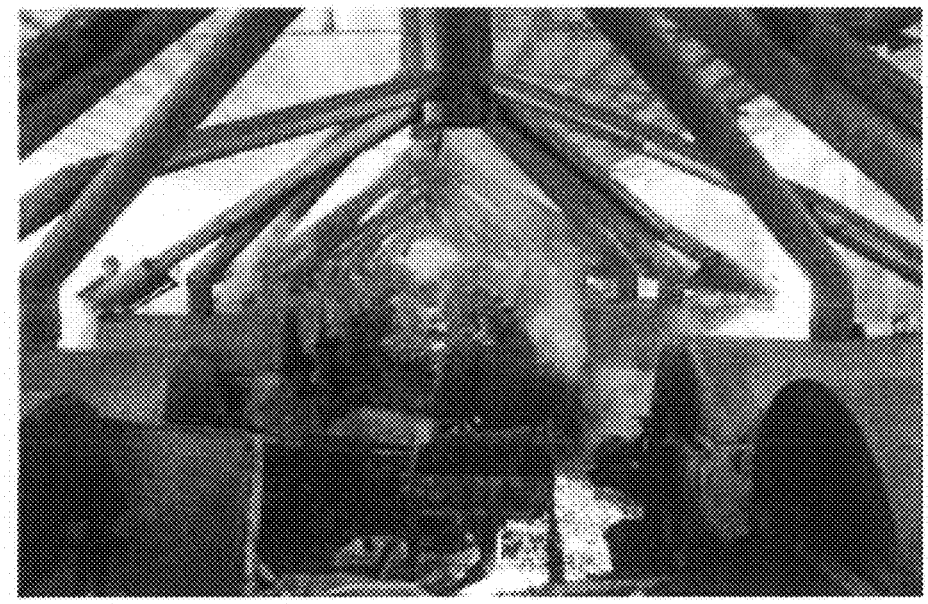
FIG. 3 is a photograph showing roasting process of chestnuts stored in refrigeration.
Figure 4:
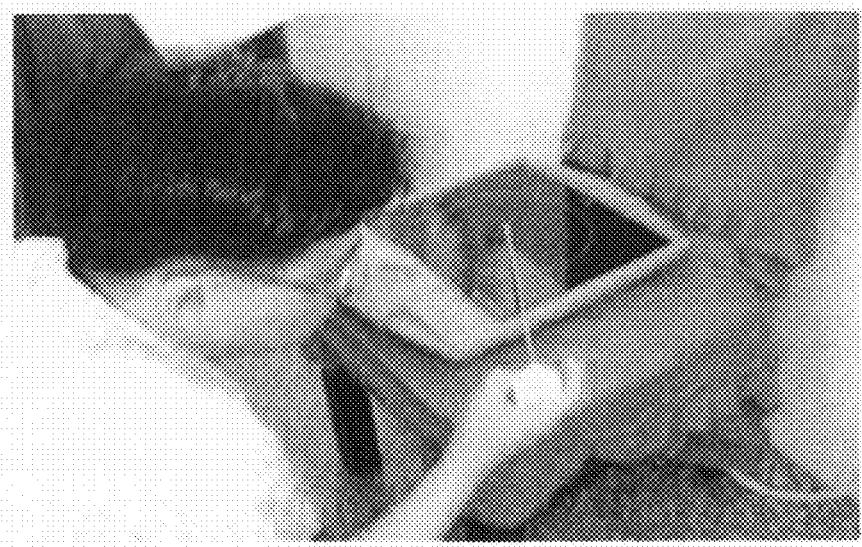
FIG. 4 is a photograph showing scene of thawing experiment by far infrared ray heater.
Figure 5:
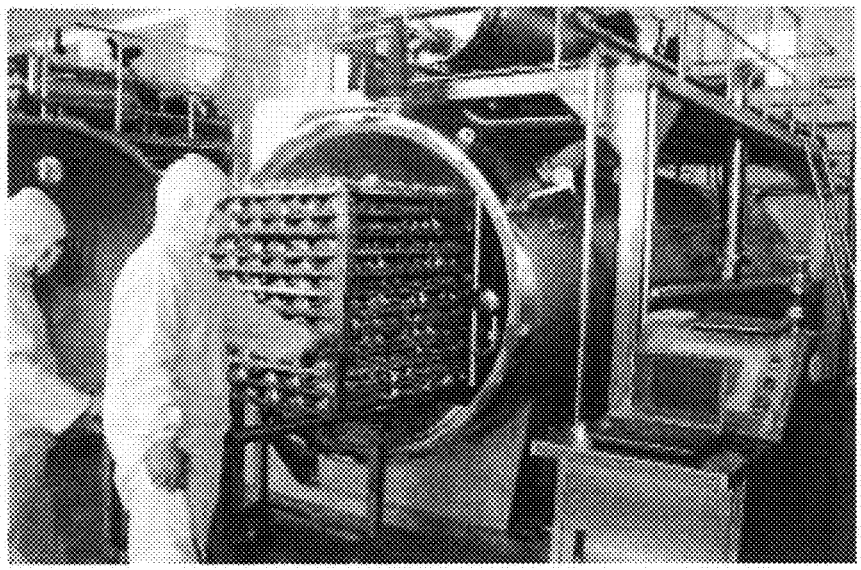
FIG. 5 is a photograph showing process for pasteurizing with 3 steps using a hot water side spray type retorter after packing thawed chestnuts with a nitrogen substitution.

The present invention will be described in detail at the below.

According to the present invention, harvested raw chestnuts are first subjected to ageing step by storing in the state of refrigeration to increase sugar content. At this time, harvested raw chestnuts are aged with refrigerating storage rapidly without peeling or steeping in sugar solution as it is, to keep freshness of chestnuts and reduce lose and degrading rate during storage.

The method of refrigerating storage of raw chestnuts according to the present invention is as followings. The raw chestnuts are stored at −2° C. in condition of 90~95% of humidity during 3 months, and then are stored at −4° C. in condition of 90~95% of humidity continuously. With the above storing method, even though it exceed general storing period of 6 months, a lose and degrading rate of chestnuts can be maintained to the least level up to a year and its sugar content can be increased to above 28° brix without any treatment such as steeping in or boiling down with sugar solution.

Next, the above raw chestnuts whose sugar content is increased by refrigerating storage is roasted in roasting furnace at 170~200° C. during 5~10 minutes together with sand and syrup by direct burning.

The surface of raw chestnuts is had a scar with a knife to peel easily before roasting, and then it is roasted in roasting furnace at 170~200° C. during 5~10 minutes together with sand and syrup.

At this time, a rate of raw chestnuts, sand and syrup is preferable 1:4.7:0.03(w/w), most preferably, roasting is performed at 180° C. during 8 minutes until a center temperature of chestnuts reach to 90° C. It is not preferable to roast at under 170° C. since chestnuts must be heated during long time at this temperature therefore chestnuts is dried by removing moisture. Also, if chestnuts is roasted at above 200° C., there is a drawback that have bitterness after retort by carbonating of chestnuts bark.

A roasting process is performed with direct burning method by using chestnuts bark and firewood as fuel, therefore roasting perfume is grant to increase preference and inhibit a microorganism derived from soil. A purpose of addition of syrup is to inhibit evaporation of moisture and to peel easily by crystallization of chestnuts bark and sugar during roasting.

The roasted chestnuts is peeled and then washed 3 times with treating water of 15° C. and followed by rapid freezing.

In the above process, the washed chestnuts are preferably packed in box with 10 kg unit and then frozen at −35° C. during 24 hours. The frozen chestnuts are pass a metal detector to detect a metal, and stored in a refrigerating storehouse kept temperature of −18° C. and humidity of above 90%.

In next process, the frozen chestnuts are thawed with far infrared ray.

The above thawing process is performed at 170~230° C. during 30~60 minutes, and a center temperature of chestnuts is preferably reached to 12~15° C. after heating by far infrared ray.

In thawing method by treating water according to the prior art, moisture is packed together with chestnuts so that a softness and cleavage of chestnuts tissue is generated, and there are many problems for quality and taste sense of chestnuts by feeling an extraordinary taste and smell by treating water.

However, in thawing method by far infrared ray according to the present invention, it can be removed easily an extraordinary taste and smell presenting in frozen chestnuts, and it can be to inhibit generation of microorganism by removing moisture totally and to maintain a fresh condition of chestnuts continuously in respect to appearance, taste, flavor, texture and color by minimizing a damage of tissue by reserving a banding water in cellular tissue of chestnuts even though it lapse 90 days from processing day. According to the present invention, an optimal condition of thawing by far infrared ray is to perform at 170~230° C. during 30~60 minutes. It is not preferable to thaw at under 170° C. since heat is not transmitted to the center of chestnuts at this temperature therefore thawing and removal of free water is not performed perfectly. Also, if thawing is performed at above 230° C., there is a drawback that have bitterness after retort by carbonating of chestnuts surface.

On the other hand, Japanese patent early publication Hei 06-209702 also discloses a preparing procedure comprising a heating step with far infrared ray at 230~280° C. during 5~10 minutes frozen chestnuts to increase sugar content and to induce color, flavor and taste of chestnuts.

However, according to the above method, harvested chestnuts are first peeled and frozen, and then thawed, and boiled, and rapidly frozen, and then heated with far infrared ray. Therefore, taste of chestnuts is less and degraded easily than processed chestnuts according to the present invention constituted with refrigerating storage without peeling of harvested raw chestnuts, water content is also high. Therefore, to solve this problem, it is necessary to thaw at higher temperature. Heating with far infrared ray is performed during short time of 5~10 minutes because of treatment at higher temperature so that it is difficult to achieve an object of induction of sweetness, color and flavor and increase of sugar content.

Therefore, it is necessary needed to comprise a steeping procedure in sugar solution and adding and mixing procedure of seasoning in the above prior art, but this procedure is not needed at all in the present invention so that there is an advantage that its procedure is very simple and economic.

In next process, the thawed chestnuts with far infrared ray are pasteurized with multi-steps after packing thawed chestnuts with a nitrogen substitution.

In this process, packing substituted with nitrogen is carried out as followings. The thawed chestnuts with far infrared ray are placed in a pouch of standing film, and then an inside air is substituted with a nitrogen to 99.0~99.5% to maintain freshness so that an inside oxygen is to 0.1~1.2%.

Pasteurizing process with multi-steps after packing thawed chestnuts with a nitrogen substitution is carried out gradually at 100° C. during 5~15 minutes, at 110° C. during 15~25 minutes, and at 115° C. during 35~40 minutes by using a hot water side spray type retorter.

In the case of high temperature sterilizing with one step at 121° C. during 30 minutes or low temperature sterilizing with one step at 110~115° C. during 40~50 minutes, a texture of chestnuts receive serious shock and a banding water in texture is removed so that a texture of chestnuts is dried and its sugar content is reduced to be bad in quality. In the present invention, a pasteurizing temperature is started at low temperature of 100~110° C. and rise gradually, therefore it is possible to minimize an influence for a texture of chestnuts so that it is possible to provide an excellent taste even though it lapse 90 days from processing day.

As being described at the above, a procedure according to the present invention is constituted with simple procedure ageing only chestnuts 100% by storing in the state of refrigeration without addition any other adduct, roasting said aged chestnuts by direct burning, peeling and then washing followed by rapid freezing it, thawing frozen chestnuts by far infrared ray, and pasteurizing with multi-steps after packing thawed chestnuts with a nitrogen substitution, thereby providing a preparing procedure of retort roast chestnuts whose quality is good and original taste and favor is remained, therefore the present invention is very useful in a food processing industry.

A greater understanding of the present invention and its concomitant advantages will be obtained by referring to the following Experimental example provided, but it is not limit the scope of the present invention.

EXPERIMENTAL EXAMPLE 1

Assay Loss Weight, Degrading Rate, Length of Embryo and Change of Sugar Content According to Condition of Refrigerating Storage after Harvesting of Raw Chestnuts A loss weight of chestnuts is generally reached to 6% when storing during 6 months. Therefore, since a storing term of chestnuts is short and its loss weight is also high, we research an optimal storing method to keep freshness and to minimize a loss weight. For this purpose, we assay loss weight, degrading rate, length of embryo and change of sugar content with the method shown table 1 during 6 months, from October 2001 harvesting chestnuts to March 2003.

TABLE 1

Loss weight, degrading rate, length of embryo and change of sugar content according to condition of refrigerating storage after harvesting of raw chestnuts

| | Result | | | |
|---|---|---|---|---|
| Method | Loss weight (%) | Degrading rate (%) | Length of embryo (mm) | Change of sugar content (° brix) |
| Temperature 0° C., Humidity 95% | 1.88 | 2.56 | 0.5 | 18 |
| Temperature −2° C., Humidity 95% | 3.2 | 2.77 | 0.3 | 19 |
| Storage at temperature −2° C. and humidity 90~95% during 3 months, and then storage at temperature −4° C. and humidity 90~95%(change of air with a day's interval during a year) | 0.8 | 1.29 | 0.1~0.3 | 31 |

As shown the above result, in case of storage at temperature −2° C. and humidity 90~95% during 3 months, and then storage at temperature −4° C. and humidity 90~95%, it is possible to minimize loss weight and degrading rate during a year and to increase sugar content related to likeness to average 31° brix.

EXPERIMENTAL EXAMPLE 2

Assay Quality According to Condition of Roasting

[First Step]

We research an optimal roasting method in aspect a quality of chestnuts. For this purpose, we assay a quality of retort roasting chestnuts prepared according to following roasting condition. An assay of quality of retort roasting chestnuts is carried out by 50 people who is skilled for assay of this kind, and an item for assay is appearance, taste, flavor, texture sense and color (lightness). A score is as followings; 5: excellent, 3: average, 1: bad.

<Roasting Condition>
(1) Temperature of a roasting furnace: 100° C., 8 minutes
(2) Temperature of a roasting furnace: 140° C., 8 minutes
(3) Temperature of a roasting furnace: 170° C., 8 minutes
(4) Temperature of a roasting furnace: 180° C., 8 minutes
(5) Temperature of a roasting furnace: 200° C., 8 minutes
(6) Temperature of a roasting furnace: 230° C., 8 minutes

TABLE 1

Assay a quality of roasting chestnuts according to lapse of term after production of retort roasting chestnuts according to roasting condition

| | Item | 0 (day) | 15 (day) | 30 (day) | 60 (day) | 90 (day) |
|---|---|---|---|---|---|---|
| 100° C., 8 minutes | appearance | 3.1 | 3.0 | 3.0 | 2.9 | 2.8 |
| | taste | 3.2 | 3.1 | 3.0 | 3.0 | 2.8 |
| | flavor | 3.1 | 3.1 | 3.0 | 2.9 | 2.7 |
| | texture sense | 3.2 | 3.0 | 2.9 | 2.9 | 2.7 |
| | color | 3.1 | 3.1 | 3.0 | 2.9 | 2.8 |
| 140° C., 8 minutes | appearance | 3.4 | 3.3 | 3.2 | 3.2 | 3.0 |
| | taste | 3.4 | 3.4 | 3.3 | 3.2 | 3.1 |
| | flavor | 3.3 | 3.3 | 3.2 | 3.2 | 3.0 |
| | texture sense | 3.3 | 3.2 | 3.1 | 3.1 | 3.1 |
| | color | 3.4 | 3.3 | 3.3 | 3.2 | 3.2 |
| 170° C., 8 minutes | appearance | 4.5 | 4.5 | 4.5 | 4.5 | 4.5 |
| | taste | 4.5 | 4.5 | 4.5 | 4.5 | 4.5 |
| | flavor | 4.5 | 4.5 | 4.5 | 4.5 | 4.5 |
| | texture sense | 4.5 | 4.5 | 4.5 | 4.5 | 4.5 |
| | color | 4.5 | 4.5 | 4.5 | 4.5 | 4.5 |
| 180° C., 8 minutes | appearance | 4.6 | 4.6 | 4.6 | 4.6 | 4.6 |
| | taste | 4.6 | 4.6 | 4.6 | 4.6 | 4.6 |
| | flavor | 4.6 | 4.6 | 4.6 | 4.6 | 4.6 |
| | texture sense | 4.6 | 4.6 | 4.6 | 4.6 | 4.6 |
| | color | 4.6 | 4.6 | 4.6 | 4.6 | 4.6 |
| 200° C., 8 minutes | appearance | 4.4 | 4.4 | 4.4 | 4.4 | 4.4 |
| | taste | 4.4 | 4.4 | 4.4 | 4.4 | 4.4 |
| | flavor | 4.4 | 4.4 | 4.4 | 4.4 | 4.4 |
| | texture sense | 4.4 | 4.4 | 4.4 | 4.4 | 4.4 |
| | color | 4.4 | 4.4 | 4.4 | 4.4 | 4.4 |
| 230° C., 8 minutes | appearance | 3.7 | 3.7 | 3.5 | 3.4 | 3.2 |
| | taste | 3.6 | 3.5 | 3.4 | 3.3 | 3.1 |
| | flavor | 3.7 | 3.5 | 3.4 | 3.2 | 3.1 |
| | texture sense | 3.7 | 3.5 | 3.4 | 3.3 | 3.1 |
| | color | 3.6 | 3.5 | 3.5 | 3.3 | 3.1 |

As shown the above result, in case of roasting chestnuts produced according to the roasting condition of the present invention, 170~200° C., 5~10 minutes, all item including appearance, taste, flavor, texture sense and color(lightness) show the score of 4.4~4.6 and its initial quality is maintain up to even though it lapse 90 days.

[Second Step]

We research an optimal roasting method in aspect a peeling degree of roasting chestnuts. For this purpose, we research a peeling degree of retort roasting chestnuts prepared according to following roasting condition. The above research is carried out by 50 person, and a score is as followings; 5: excellent, 3: average, 1: bad.

<Roasting Condition>
(1) 100° C., 8 minutes
(2) 140° C., 8 minutes
(3) 170° C., 8 minutes
(4) 180° C., 8 minutes
(5) 180° C., 8 minutes (no adding syrup)
(6) 200° C., 8 minutes
(7) 230° C., 8 minutes

TABLE 3

Peeling degree of roasting chestnuts according to roasting condition

| Condition | Peeling degree |
|---|---|
| 100° C., 8 minutes | 3.2 |
| 140° C., 8 minutes | 3.2 |
| 170° C., 8 minutes | 4.5 |

TABLE 3-continued

Peeling degree of roasting chestnuts
according to roasting condition

| Condition | Peeling degree |
|---|---|
| 180° C., 8 minutes | 4.6 |
| 180° C., 8 minutes (no adding syrup) | 4.1 |
| 200° C., 8 minutes | 4.5 |
| 230° C., 8 minutes | 3.5 |

As shown the above result, in case of roasting chestnuts produced according to the roasting condition of the present invention, 170~200° C., 5~10 minutes, the bark of roasting chestnuts is easily peeled. Furthermore, in case of adding syrup, it is more easily peeled than in case of no adding syrup.

EXPERIMENTAL EXAMPLE 3

Assay Quality According to Condition of Thawing

[First Step]

We research an optimal thawing method by far infrared ray in aspect a quality of chestnuts. For this purpose, we assay a quality of retort roasting chestnuts prepared according to following thawing condition. An assay of quality of retort roasting chestnuts is carried out by 50 people who is skilled for assay of this kind, and an item for assay is appearance, taste, flavor, texture sense and color (lightness). A score is as followings; 5: excellent, 3: average, 1: bad.

<Thawing Condition>

(1) thawing by far infrared ray: Temperature of up and down: 180° C., 40 minutes for thawing time, in the Far Infrared Ray Oven (Purchased from SUNWOO Ltd., Name of products: Ceramic Electrichighlight CT-1805, Manufactured by ROMMELSBACHER ELEKTRO-HAUSGERATE GMBH)

(2) thawing by treating water: 15° C. of treating water, 40 minutes for thawing time (3) no thawing step: being packed a frozen chestnuts without thawing (4) thawing by boiled treating water: 100° C. of boiled treating water, 10 minutes for thawing time.

TABLE 4

Assay a quality of roasting chestnuts according to lapse of term after
production of retort roasting chestnuts according to thawing condition

| | Item | 0 (day) | 15 (day) | 30 (day) | 60 (day) | 90 (day) |
|---|---|---|---|---|---|---|
| thawing by far infrared ray | appearance | 4.5 | 4.5 | 4.5 | 4.5 | 4.5 |
| | taste | 4.5 | 4.5 | 4.5 | 4.5 | 4.5 |
| | flavor | 4.5 | 4.5 | 4.5 | 4.5 | 4.5 |
| | texture | 4.5 | 4.5 | 4.5 | 4.5 | 4.5 |
| | color | 4.5 | 4.5 | 4.5 | 4.5 | 4.5 |
| thawing by treating water | appearance | 3.9 | 3.9 | 3.9 | 3.8 | 3.7 |
| | taste | 4.1 | 4.1 | 4.1 | 3.8 | 3.8 |
| | flavor | 4.1 | 4.1 | 4.0 | 3.9 | 3.9 |
| | texture | 3.9 | 3.9 | 3.9 | 3.9 | 3.8 |
| | color | 3.9 | 3.9 | 3.7 | 3.7 | 3.7 |
| no thawing step | appearance | 3.7 | 3.7 | 3.7 | 3.4 | 3.3 |
| | taste | 3.5 | 3.5 | 3.5 | 3.4 | 3.4 |
| | flavor | 3.6 | 3.6 | 3.6 | 3.4 | 3.4 |
| | texture | 3.8 | 3.8 | 3.8 | 3.4 | 3.4 |
| | color | 3.7 | 3.7 | 3.7 | 3.4 | 3.4 |

TABLE 4-continued

Assay a quality of roasting chestnuts according to lapse of term after
production of retort roasting chestnuts according to thawing condition

| | Item | 0 (day) | 15 (day) | 30 (day) | 60 (day) | 90 (day) |
|---|---|---|---|---|---|---|
| thawing by boiled treating water | appearance | 3.6 | 3.6 | 3.6 | 3.3 | 3.3 |
| | taste | 3.6 | 3.6 | 3.6 | 3.4 | 3.4 |
| | flavor | 3.6 | 3.6 | 3.6 | 3.3 | 3.3 |
| | texture | 3.5 | 3.5 | 3.5 | 3.3 | 3.3 |
| | color | 3.5 | 3.5 | 3.5 | 3.4 | 3.4 |

As shown the above result, in case of roasting chestnuts produced according to the thawing condition by far infrared ray of the present invention, all item including appearance, taste, flavor, texture sense and color (lightness) show the score of 4.5 and its initial quality is maintain up to even though it lapse 90 days.

[Second Step]

We research an optimal thawing temperature and time by far infrared ray in aspect a quality of chestnuts.

For this purpose, we assay a quality of retort roasting chestnuts prepared according to following thawing condition. An assay of quality of retort roasting chestnuts is carried out according to the same method with the above-described first step.

<Thawing Condition 2-1>

(1) Up and down temperature of the Far Infrared Ray Oven: 150° C., 40 minutes for thawing time
(2) Up and down temperature of the Far Infrared Ray Oven: 170° C., 40 minutes for thawing time
(3) Up and down temperature of the Far Infrared Ray Oven: 180° C., 40 minutes for thawing time
(4) Up and down temperature of the Far Infrared Ray Oven: 200° C., 40 minutes for thawing time
(5) Up and down temperature of the Far Infrared Ray Oven: 230° C., 40 minutes for thawing time
(6) Up and down temperature of the Far Infrared Ray Oven: 250° C., 40 minutes for thawing time

TABLE 5

Assay a quality of roasting chestnuts according to lapse of term after
production of retort roasting chestnuts according to thawing condition

| | Item | 0 (day) | 15 (day) | 30 (day) | 60 (day) | 90 (day) |
|---|---|---|---|---|---|---|
| 150° C., 40 minutes | appearance | 3.3 | 3.3 | 3.2 | 3.1 | 3.0 |
| | taste | 3.3 | 3.2 | 3.1 | 3.1 | 3.0 |
| | flavor | 3.3 | 3.3 | 3.2 | 3.2 | 3.1 |
| | texture sense | 3.4 | 3.3 | 3.1 | 3.0 | 2.9 |
| | color | 3.2 | 3.1 | 3.1 | 3.0 | 2.9 |
| 170° C., 40 minutes | appearance | 4.5 | 4.4 | 4.4 | 4.3 | 4.3 |
| | taste | 4.5 | 4.5 | 4.4 | 4.4 | 4.3 |
| | flavor | 4.5 | 4.5 | 4.4 | 4.4 | 4.4 |
| | texture sense | 4.4 | 4.4 | 4.4 | 4.3 | 4.3 |
| | color | 4.5 | 4.5 | 4.4 | 4.3 | 4.3 |
| 180° C., 40 minutes | appearance | 4.5 | 4.5 | 4.5 | 4.5 | 4.5 |
| | taste | 4.5 | 4.5 | 4.5 | 4.5 | 4.5 |
| | flavor | 4.5 | 4.5 | 4.5 | 4.5 | 4.5 |
| | texture sense | 4.5 | 4.5 | 4.5 | 4.5 | 4.5 |
| | color | 4.5 | 4.5 | 4.5 | 4.5 | 4.5 |
| 200° C., 40 minutes | appearance | 4.5 | 4.5 | 4.5 | 4.4 | 4.4 |
| | taste | 4.5 | 4.4 | 4.4 | 4.3 | 4.3 |
| | flavor | 4.5 | 4.5 | 4.4 | 4.4 | 4.4 |
| | texture sense | 4.5 | 4.5 | 4.4 | 4.4 | 4.3 |
| | color | 4.5 | 4.5 | 4.4 | 4.4 | 4.4 |

TABLE 5-continued

Assay a quality of roasting chestnuts according to lapse of term after production of retort roasting chestnuts according to thawing condition

| | Item | 0 (day) | 15 (day) | 30 (day) | 60 (day) | 90 (day) |
|---|---|---|---|---|---|---|
| 230° C., 40 minutes | appearance | 4.5 | 4.5 | 4.4 | 4.4 | 4.4 |
| | taste | 4.5 | 4.4 | 4.4 | 4.4 | 4.3 |
| | flavor | 4.5 | 4.4 | 4.4 | 4.3 | 4.3 |
| | texture sense | 4.5 | 4.5 | 4.4 | 4.4 | 4.3 |
| | color | 4.4 | 4.4 | 4.3 | 4.3 | 4.3 |
| 250° C., 40 minutes | appearance | 3.7 | 3.6 | 3.4 | 3.3 | 3.3 |
| | taste | 3.8 | 3.7 | 3.4 | 3.4 | 3.3 |
| | flavor | 3.6 | 3.5 | 3.5 | 3.4 | 3.3 |
| | texture sense | 3.4 | 3.3 | 3.1 | 3.1 | 3.0 |
| | color | 3.5 | 3.3 | 3.1 | 3.0 | 2.9 |

<Thawing Condition 2-2>
(1) Up and down temperature of the Far Infrared Ray Oven: 180° C., 20 minutes for thawing time
(2) Up and down temperature of the Far Infrared Ray Oven: 180° C., 30 minutes for thawing time
(3) Up and down temperature of the Far Infrared Ray Oven: 180° C., 40 minutes for thawing time
(4) Up and down temperature of the Far Infrared Ray Oven: 180° C., 50 minutes for thawing time
(5) Up and down temperature of the Far Infrared Ray Oven: 180° C., 60 minutes for thawing time
(6) Up and down temperature of the Far Infrared Ray Oven: 180° C., 70 minutes for thawing time

TABLE 6

Assay a quality of roasting chestnuts according to lapse of term after production of retort roasting chestnuts according to thawing condition

| | Item | 0 (day) | 15 (day) | 30 (day) | 60 (day) | 90 (day) |
|---|---|---|---|---|---|---|
| 180° C., 20 minutes | appearance | 3.7 | 3.5 | 3.4 | 3.3 | 3.2 |
| | taste | 3.6 | 3.5 | 3.5 | 3.4 | 3.3 |
| | flavor | 3.5 | 3.3 | 3.1 | 3.1 | 3.0 |
| | texture sense | 3.6 | 3.6 | 3.4 | 3.4 | 3.2 |
| | color | 3.4 | 3.4 | 3.3 | 3.3 | 3.1 |
| 30 minutes | appearance | 4.5 | 4.4 | 4.4 | 4.4 | 4.3 |
| | taste | 4.5 | 4.5 | 4.4 | 4.4 | 4.4 |
| | flavor | 4.5 | 4.4 | 4.3 | 4.3 | 4.3 |
| | texture sense | 4.5 | 4.4 | 4.4 | 4.4 | 4.4 |
| | color | 4.4 | 4.3 | 4.3 | 4.3 | 4.3 |
| 40 minutes | appearance | 4.5 | 4.5 | 4.5 | 4.5 | 4.5 |
| | taste | 4.5 | 4.5 | 4.5 | 4.5 | 4.5 |
| | flavor | 4.5 | 4.5 | 4.5 | 4.5 | 4.5 |
| | texture sense | 4.5 | 4.5 | 4.5 | 4.5 | 4.5 |
| | color | 4.5 | 4.5 | 4.5 | 4.5 | 4.5 |
| 50 minutes | appearance | 4.5 | 4.5 | 4.4 | 4.4 | 4.3 |
| | taste | 4.5 | 4.4 | 4.4 | 4.3 | 4.3 |
| | flavor | 4.4 | 4.4 | 4.3 | 4.3 | 4.3 |
| | texture sense | 4.4 | 4.4 | 4.3 | 4.3 | 4.3 |
| | color | 4.5 | 4.5 | 4.4 | 4.3 | 4.3 |
| 60 minutes | appearance | 4.5 | 4.4 | 4.4 | 4.3 | 4.3 |
| | taste | 4.4 | 4.3 | 4.3 | 4.3 | 4.3 |
| | flavor | 4.5 | 4.5 | 4.4 | 4.4 | 4.4 |
| | texture sense | 4.4 | 4.3 | 4.3 | 4.3 | 4.3 |
| | color | 4.4 | 4.3 | 4.3 | 4.3 | 4.3 |
| 70 minutes | appearance | 3.7 | 3.5 | 3.5 | 3.4 | 3.3 |
| | taste | 3.6 | 3.5 | 3.5 | 3.4 | 3.4 |
| | flavor | 3.6 | 3.6 | 3.5 | 3.4 | 3.4 |
| | texture sense | 3.5 | 3.4 | 3.3 | 3.3 | 3.0 |
| | color | 3.6 | 3.6 | 3.4 | 3.4 | 3.2 |

As shown the above result, in case of roasting chestnuts produced according to the thawing condition of the present invention, all item including appearance, taste, flavor, texture sense and color (lightness) show the score of 4.3~4.5 and its initial quality is maintain up to even though it lapse 90 days. From this result, we can confirm that the thawing condition of the present invention, 170~230° C., 30~60 minutes, is an optimal condition.

EXPERIMENTAL EXAMPLE 4

Assay Quality According to Retort Sterilizing Condition

We intend to research an excellency of retort roasting chestnuts according to the condition of pasteurizing with multi-steps. For this purpose, we assay a quality of retort roasting chestnuts prepared according to following sterilizing condition. An assay of quality of retort roasting chestnuts is carried out by 50 people who is skilled for assay of this kind, and an item for assay is appearance, taste, flavor, texture sense and color (lightness). A score is as followings; 5: excellent, 3: average, 1: very bad.

<Sterilizing Condition>
(1) Sterilizing Condition
   a) pasteurizing with three-steps: at 100° C. during 10 minutes+at 110° C. during 20 minutes+at 115° C. during 38 minutes
   b) sterilizing at high temperature with one-steps: at 121° C. during 30 minutes
   c) pasteurizing with one-steps: at 100° C. during 45 minutes
(2) sterilizing machine: Hot water side spray type retorter (SHINHAMKI COOKONG STERILIZER, SOYA FOOD HEUYEP INDUSTIAL LIMITED)
(3) thawing method: 15° C. of treating water

TABLE 7

Assay a quality of roasting chestnuts according to lapse of term after production of retort roasting chestnuts according to sterilizing condition.

| | Item | 0 (day) | 15 (day) | 30 (day) | 60 (day) | 90 (day) |
|---|---|---|---|---|---|---|
| pasterizing with three-steps | appearance | 4.2 | 4.2 | 4.1 | 4.1 | 4.0 |
| | taste | 4.2 | 4.2 | 4.2 | 4.0 | 4.0 |
| | flavor | 4.2 | 4.2 | 4.1 | 4.1 | 4.0 |
| | texture sense | 4.2 | 4.0 | 4.0 | 4.0 | 4.0 |
| | color | 4.1 | 4.1 | 4.0 | 4.0 | 3.9 |
| sterilizing at high temperature with one-step | appearance | 3.5 | 3.4 | 3.3 | 3.1 | 3.1 |
| | taste | 3.5 | 3.4 | 3.3 | 3.1 | 3.0 |
| | flavor | 3.5 | 3.4 | 3.4 | 3.2 | 3.1 |
| | texture sense | 3.4 | 3.3 | 3.3 | 3.1 | 3.0 |
| | color | 3.4 | 3.3 | 3.2 | 3.2 | 3.0 |
| pasteurizing with one-steps | appearance | 3.7 | 3.6 | 3.5 | 3.5 | 3.4 |
| | taste | 3.7 | 3.6 | 3.6 | 3.4 | 3.4 |
| | flavor | 3.6 | 3.5 | 3.5 | 3.4 | 3.4 |
| | texture sense | 3.7 | 3.6 | 3.5 | 3.5 | 3.4 |
| | color | 3.7 | 3.6 | 3.6 | 3.5 | 3.5 |

As shown the above result, in case of roasting chestnuts produced according to the gradual pasteurizing with three-steps the present invention, all item including appearance, taste, flavor, texture sense and color (lightness) show the score of 4.0~4.2 and its initial quality is maintain up to even though it lapse 90 days.

INDUSTRIAL AVAILABILITY

As described in detail through the above example, a procedure according to the present invention is constituted with simple procedure ageing only chestnuts 100% by storing in the state of refrigeration without addition any other adduct, roasting said aged chestnuts by direct burning, peeling and then washing followed by rapid freezing it, thawing frozen chestnuts by far infrared ray, and pasteurizing with multi-steps after packing thawed chestnuts with a nitrogen substitution, thereby providing a preparing procedure of retort roast chestnuts whose quality is good and original taste and favor is remained, therefore the present invention is very useful invention in a food processing industry.

The invention claimed is:

1. A method for preparing retort roast chestnuts comprising, in the following order:
   aging raw chestnuts by storing said raw chestnuts under refrigeration;
   roasting said aged chestnuts;
   peeling and washing said roasted chestnuts;
   freezing said peeled and washed chestnuts;
   thawing said frozen chestnuts by far infrared ray;
   packing said thawed chestnuts with a nitrogen substitution; and
   pasteurizing said packed chestnuts wherein said pasteurization process is carried out a temperature of 100° C. for 5-15 minutes, at a temperature of 110° C. for 15-25 minutes, and at a temperature of 115° C. for 35-40 minutes, sequentially.

2. The method according to claim 1, wherein said raw chestnuts are stored at −2° C. in condition of 90-95% of humidity for 3 months, and then are stored at −4° C. in condition of 90-95% of humidity.

3. The method according to claim 1, wherein said aged chestnuts are roasted in a roasting furnace at 170-200° C. for 5-10 minutes together with sand and syrup by burning.

4. The method according to claim 1, wherein said thawing process by far infrared ray is performed at 170-230° C. for 30-60 minutes.

5. The method according to claim 1, wherein said packing substituted with a nitrogen is carried out such that said thawed chestnuts are placed in a pouch of standing film, and then air inside of the pouch is substituted with nitrogen to 99.0-99.5°% and oxygen inside of the pouch remains at 0.1%-1.0%.

6. A method for preparing retort roast chestnuts comprising, in the following order:
   aging raw chestnuts by storing said raw chestnuts at −2° C. in condition of 90-95% of humidity for 3 months, and then at −4° C. in condition of 90-95% of humidity;
   roasting said aged chestnuts in a roasting furnace at 170-200° C. for 5-10 minutes together with sand and syrup by burning;
   peeling and washing said roasted chestnuts;
   freezing said peeled and washed chestnuts;
   thawing said frozen chestnuts by far infrared ray at 170-230° C. for 30-60 minutes;
   packing said thawed chestnuts with a nitrogen substitution such that said thawed chestnuts are placed in a pouch of standing film, and then air inside of the pouch is substituted with nitrogen to 99.0-99.5% and oxygen inside of the pouch remains at 0.1%-1.0%; and
   pasteurizing said packed chestnuts at a temperature of 100° C. for 5-15 minutes, at a temperature of 110° C. for 15-25 minutes, and at a temperature of 115° C. for 35-40 minutes, sequentially.

* * * * *